US009005083B2

(12) United States Patent
Karrar

(10) Patent No.: US 9,005,083 B2
(45) Date of Patent: Apr. 14, 2015

(54) START SAFETY CIRCUIT ARRANGEMENT IN A WORK APPARATUS HAVING AN INTERNAL COMBUSTION ENGINE

(71) Applicant: Andreas Stihl AG & Co. KG, Waiblingen (DE)

(72) Inventor: Carel Karrar, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 13/930,021

(22) Filed: Jun. 28, 2013

(65) Prior Publication Data

US 2014/0005001 A1 Jan. 2, 2014

(30) Foreign Application Priority Data

Jun. 28, 2012 (DE) ........................ 10 2012 012 827

(51) Int. Cl.

| | |
|---|---|
| ***B60W 10/04*** | (2006.01) |
| ***B60W 10/18*** | (2012.01) |
| ***F02D 29/00*** | (2006.01) |
| ***F02M 1/02*** | (2006.01) |
| ***F02P 11/02*** | (2006.01) |
| *F02D 17/04* | (2006.01) |

(52) U.S. Cl.

CPC ................. *F02D 29/00* (2013.01); *F02M 1/02* (2013.01); *F02P 11/025* (2013.01); *F02D 17/04* (2013.01); *F02D 2400/06* (2013.01)

(58) Field of Classification Search

USPC ................. 477/182–185, 199, 200, 203, 204

See application file for complete search history.

(56) References Cited

U.S. PATENT DOCUMENTS

| | | | | |
|---|---|---|---|---|
| 4,226,312 | A | 10/1980 | Zindler | |
| 4,460,072 | A | 7/1984 | Moerner et al. | |
| 4,717,207 | A * | 1/1988 | Kubota et al. | 303/3 |
| 4,936,429 | A * | 6/1990 | Mackoway et al. | 477/182 |
| 7,118,097 | B2 | 10/2006 | Moriyama et al. | |
| 2002/0112688 | A1 * | 8/2002 | Fariz et al. | 123/179.2 |
| 2002/0134362 | A1 * | 9/2002 | Deutsch | 123/575 |
| 2008/0305929 | A1 * | 12/2008 | Koga | 477/115 |
| 2009/0193669 | A1 | 8/2009 | Gorenflo | |
| 2010/0224466 | A1 | 9/2010 | Leinmueller et al. | |
| 2012/0190500 | A1 * | 7/2012 | Yamada et al. | 477/184 |
| 2014/0000542 | A1 | 1/2014 | Karrar et al. | |
| 2014/0000543 | A1 | 1/2014 | Karrar | |
| 2014/0000544 | A1 | 1/2014 | Karrar | |

FOREIGN PATENT DOCUMENTS

| | | | |
|---|---|---|---|
| DE | 75 26 726 | U | 12/1975 |
| DE | 33 08 400 | A1 | 9/1983 |
| DE | 83 06 837 | U1 | 3/1986 |
| DE | 41 25 846 | A1 | 2/1993 |
| DE | 20 2004 004 467 | U1 | 5/2004 |
| DE | 10 2009 036 372 | A1 | 2/2011 |

* cited by examiner

*Primary Examiner* — Justin Holmes

(74) *Attorney, Agent, or Firm* — Walter Ottesen P.A.

(57) ABSTRACT

A start safety circuit arrangement is incorporated into a work apparatus having an internal combustion engine. Combustion air and fuel are supplied to the combustion chamber by a control unit for the engine operation. The fuel/air mixture in the combustion chamber is ignited by an ignition plug. An operating mode selector has a start position for enriching the fuel/air mixture. A safety brake device in an operating mode brakes the work tool. A start position sensor is arranged on the operating mode selector and a brake position sensor is associated with the safety brake device. The status signal of the brake position sensor and the status signal of the start position sensor are combined to cause the control unit to disable the engine operation if the operating mode selector is in start position (III) and the safety brake device is in its standby mode (B).

20 Claims, 2 Drawing Sheets

START SAFETY CIRCUIT ARRANGEMENT IN A WORK APPARATUS HAVING AN INTERNAL COMBUSTION ENGINE

CROSS REFERENCE TO RELATED APPLICATION

This application claims priority of German patent application no. 10 2012 012 827.4, filed Jun. 28, 2012, the entire content of which is incorporated herein by reference.

FIELD OF THE INVENTION

The invention relates to a start safety circuit arrangement in a work apparatus having an internal combustion engine.

BACKGROUND OF THE INVENTION

A start safety circuit of this type in the case of a hand-held work apparatus is disclosed in United States patent application publication 2009/0193669. A control device checks the status signals of a plurality of sensors in order to switch off main or ancillary units of the work apparatus as a function of their switching states. It is thus inter alia proposed in the case of a non-rotating drive motor and a disengaged brake unit to switch off the ignition, so that it is not possible for the internal combustion engine to start. This requires that in order for the control system to intervene in an appropriate manner it must first detect that the drive motor is not rotating. In the case of a non-rotating drive motor, electrical energy is required in order to detect the operating status and to evaluate the signals of the sensors; this electrical energy can be made available, for example, by way of a battery.

SUMMARY OF THE INVENTION

It is an object of the invention to incorporate a start safety circuit arrangement in a work apparatus having an internal combustion engine in such a manner that it is only possible to start the internal combustion engine and run it at a high rotational speed in the case of predetermined start conditions.

The start safety circuit arrangement of the invention is for a work apparatus. The work apparatus includes an internal combustion engine having a cylinder defining a combustion chamber and having a spark plug in the combustion chamber; a control unit configured for the operation of the engine by controlling a supply of combustion air and fuel to the combustion chamber to form an air/fuel mixture and igniting the air/fuel mixture via the spark plug; an operating mode, selector for bringing the engine into operation; the operating mode selector including an operating position and start position (III) for enriching the air/fuel mixture; a work tool operatively connected to the engine; a brake unit operatively connected to the work tool; and, a safety brake device configured to brake the work tool via the brake unit in an operating state of the work tool and configured to enable the work tool in an operationally-ready state (B) when the brake unit is released. The start safety circuit arrangement includes: an operation sensor assigned to the safety brake device and configured for emitting a first status signal as to the operating state of the safety brake device; a position sensor arranged on the operating mode selector and configured for emitting a second status signal; and, a circuit for combining the first and second status signals so as to cause the control unit to disable the operation of the engine when the operating mode selector is in the start position (III) and the safety braking device is in the operationally ready state (B) with the brake unit released.

The status signal of the brake position sensor that is arranged on the safety brake device and the status signal of the start position sensor that is arranged on the operating mode selector are logically combined. The control unit always disables the engine operation if the operating mode selector is in the start position and the safety brake device is in its standby mode with the brake disengaged.

The start position sensor that is arranged on the operating mode selector detects an engaged start position of the operating mode selector; in this start position an energy-rich, enriched mixture is supplied to the internal combustion engines by way of a start-enriched mixture in order to facilitate a reliable start.

Since, in the case of a rich mixture during a start-up, the rotational speed of the internal combustion engine can drastically increase and can lead to an adverse effect on the centrifugal clutch that drives the work tool, it is provided in accordance with the invention to always disable the engine operation by way of a control unit if the operating mode selector is in its start position and the safety brake device is in its standby mode with the brake disengaged. It is therefore impossible to start the internal combustion engine when the mixture is enriched (start position of the operating mode selector), without the safety brake device having been engaged, by way of which the work tool is braked and/or disabled.

The term 'control unit' is generally understood to mean a device that ensures the engine operation of the internal combustion engine; the control unit can therefore comprise the fuel supply, the mixture preparation, the ignition of the mixture and/or further elements that are necessary for the operation of the internal combustion engine, by way of which, for example by means of deactivation, an engine operation of the internal combustion engine is deactivated.

The ignition of the mixture is prevented in a simple manner, for which purpose the control unit comprises an ignition module that is connected to an ignition plug, which ignition module is switched off, in other words is switched to inactive, when the operating mode selector is in the start position and the safety brake device is in the stand-by mode (disengaged brake). Ignition sparks cannot occur at the ignition plug if the ignition module is inactive or if it is not switched to active. The mixture can therefore not be ignited; the internal combustion engine does not start. The engine operation is disabled.

It is practical to switch the ignition module to inactive by connecting a short circuit contact to ground, wherein, in a simple embodiment, the sensors themselves can produce an electrical contact and by means of a corresponding electrical connection directly produce the connection to ground. It is preferred that the start position sensor and/or the brake position sensor is embodied as a switch, for example as a microswitch, wherein the contacts of the sensors of the operating mode selector and the safety brake device form an electrical series connection that connects a short circuit contact of the ignition module to ground.

According to a further feature of the invention, the series connection of the contacts of the sensors is arranged as a branch parallel to a short circuit switch of the ignition module, wherein the short circuit switch and the series connection are preferably connected to a common ground point.

An optical display, that is preferably embodied as an LED, is provided to indicate to the user that the engine operation is disabled, in other words for example the ignition is switched off.

According to another feature of the invention, a start position sensor and/or a brake position sensor can be embodied by a sensor that functions in a non-contacting manner, wherein the output signals of the sensors and of a short circuit switch are expediently transmitted to a logic evaluating circuit that switches a switch in order to provide the connection to ground.

As an alternative or in addition to deactivating the ignition module, the control unit can comprise a fuel valve that is switched to an off position when the operating mode selector is in the start position and when the safety brake device is in the stand-by mode (disengaged brake), so that the fuel supply is inactive, in other words no fuel is available for the preparation of a fuel/air mixture.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
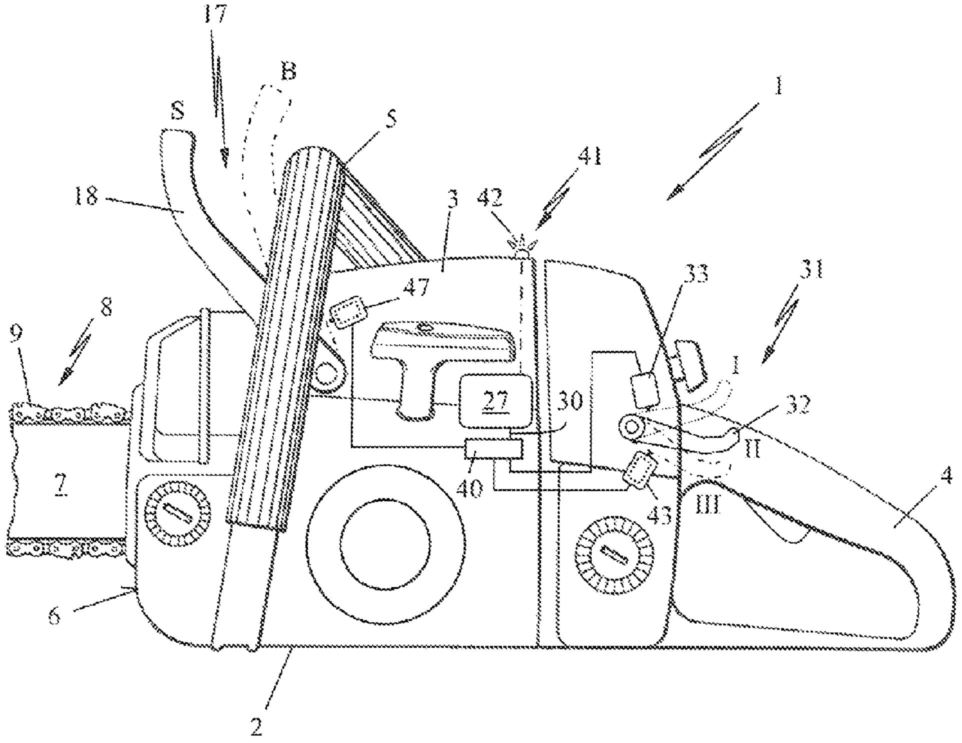
FIG. 1 is a schematic of a work apparatus having a start safety circuit arrangement in accordance with the invention.

The hand-held, portable work apparatus 1 illustrated in FIG. 1 is a motorized chain saw; this is also exemplary for other work apparatus such as cutting grinders, brush cutters, hedge cutters or the like that are to be included by the general term ‘work apparatus’.

The work apparatus 1 that is embodied as a motorized chain saw 2 comprises essentially a housing 3 that includes a hand grip 4 that is at the rear as seen in the longitudinal direction of the work apparatus 1. The housing 3 is bridged by a bale handle that forms a front hand grip 5. A release lever 18 for a safety brake device 19 is arranged in front of the bale handle as a hand protector 17, as illustrated schematically in FIG. 2.

A guide bar 7 that runs in the longitudinal direction of the work apparatus 1 is fastened to the end face 6 of the housing 3 of the work apparatus 1. End face 6 is opposite to the hand grip 4 that is provided at the rear of the work apparatus, and a saw chain 9 as a working tool 8 is guided in a continuously moving manner in the peripheral guide groove of the guide bar.

Figure 2:
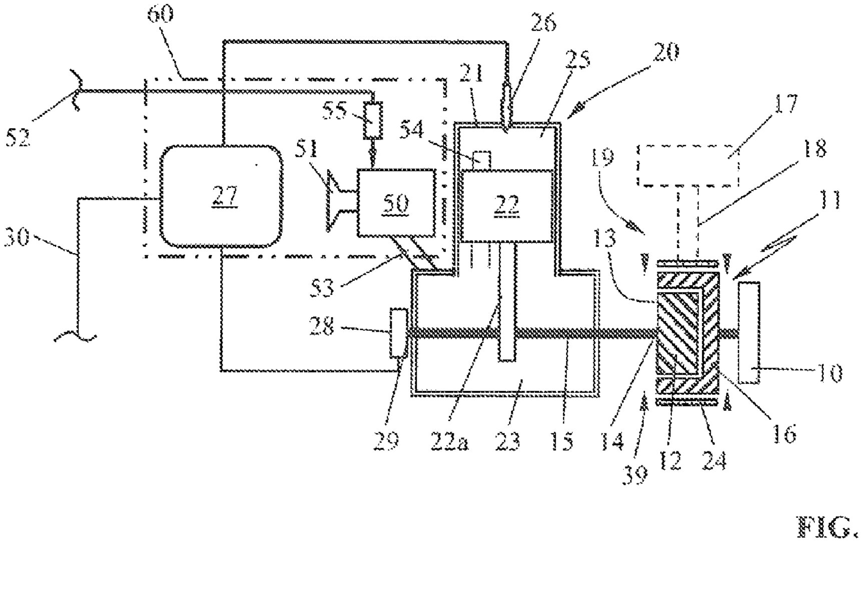
FIG. 2 is a schematic of an internal combustion engine having a tool that is driven by a clutch.

An internal combustion engine 20 is arranged as a drive motor in the housing 3 of the work apparatus 1, as shown in FIG. 2. The drive motor is preferably a single-cylinder, two-stroke engine and in the exemplary embodiment comprises a cylinder 21 having a piston 22 and a crankcase 23 having a crank shaft 15. The crank shaft 15 is rotatably mounted in the crankcase 23 and is drivingly connected at one end 14 to a clutch 11 that is a centrifugal clutch 12 in the embodiment shown. The drive part 13 of the clutch 11 is connected to the crank shaft 15 and is contacted by a driven part 16 that drives the work tool. The working tool 8 in the embodiment shown is the saw chain 9 that is driven by way of a drive sprocket 10 that rotates with the driven part 16.

The safety brake device 19 that comprises a brake band 24 that encircles the driven part 16 is allocated to the clutch 11, in particular to the driven part 16 of the clutch 11. If the safety brake device 19 is disengaged by way of the release lever 18, the brake band 24 is placed around the driven part 16 in the direction of the arrow 39; the brake band 24 encircles the driven part 16 in this case. When the brake band 24 is in the applied position, the driven part 16 is disabled, in other words it cannot rotate. The working tool 8 does not move.

The piston 22 defines in the cylinder 21 a combustion chamber 25 into which an ignition plug 26 protrudes. The ignition plug is controlled by an ignition module 27. The ignition module 27 is supplied with energy by a generator 28 that is arranged on the other end 29 of the crank shaft 15.

The fuel/air mixture necessary for the operation of the internal combustion engine 20 is supplied to the combustion chamber 25 by way of a device for preparing the mixture, which device is a carburetor 50 in the exemplary embodiment. The carburetor 50 draws in combustion air by way of an air filter 51 and this combustion air is added to the fuel in the carburetor housing. This fuel is supplied via a fuel line 52. The prepared mixture is then—in a similar manner to a known manner of flushing a crankcase in the case of two stroke engines—drawn into the crankcase 23 by way of an intake duct 53, in order then to flow into the combustion chamber 25 by way of the transfer ports 54 that are controlled by the piston 22. In order to meter the amount of fuel being supplied, it can be advantageous to arrange a fuel valve 55 in the fuel line 52. The fuel valve is especially an electromagnetically controlled fuel valve. The opening times of the fuel valve 55 are controlled, for example, by way of a control unit 60.

The supply of fuel and combustion air is likewise necessary for the engine operation of the internal combustion engine 20, as, for example, are the preparation of the mixture in a carburetor 50 and the ignition of the mixture in the combustion chamber 25 by way of an ignition plug 26. These elements are represented individually or in combination by the general term control unit 60. In FIG. 2, this control unit 60 is indicated by a dashed-dotted line.

If the control unit 60—or component groups of the control unit 60 such as an ignition module 27 or a control of the fuel valve 55—is disabled, switched off or switched to inactive in another manner, then the internal combustion engine 20 is not operational, the internal combustion engine 20 is switched off and the engine operation is disabled. The switching of the control unit 60 to inactive consequently corresponds to the engine being switched off and/or to the engine operation being disabled.

Figure 3:
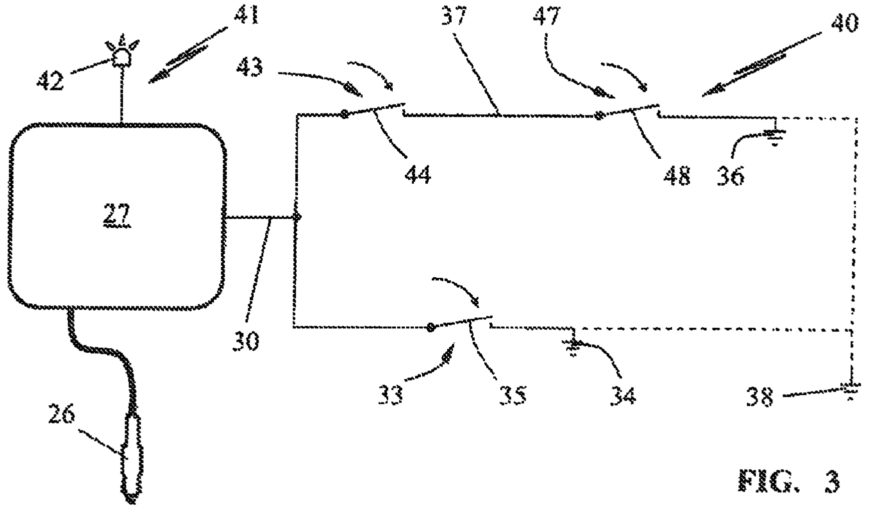
FIG. 3 shows an electrical circuit relating to a short circuit input of an ignition module.

In a simple exemplary embodiment, a short circuit line 30 is provided on the ignition module 27 for disabling the engine operation, for example for switching off the internal combustion engine 20. The short circuit line 30 is connected to a start safety circuit 40 in accordance with the invention, for example, as shown in FIG. 3.

During the operation of the internal combustion engine 20, an ignitable fuel/air mixture is conveyed into the combustion chamber 25 and compressed by way of the upwardly traveling piston 22. In the region of top dead center of the piston 22, an ignition spark is generated by the ignition module 27 at the ignition plug 26. The ignition spark ignites the mixture and the piston 22 is driven downward. The up and down movement of the piston 22 is converted into a rotational movement of the crankshaft 15 by way of a connecting rod 22*a*.

In order to start the internal combustion engine 20, an operating mode selector 31 is provided on the work apparatus. The operating mode selector is operated in the three operating positions I, II and III by way of a control lever 32 (FIG. 1).

In position I, the off position, the control lever 32 actuates a short circuit switch 33 (FIG. 3), which then always connects the ignition module 27 to ground 34 if the contact 35 of the short circuit switch is closed. As FIG. 3 illustrates, the shore circuit switch 33 corresponding to the start safety circuit 40 is connected to the short circuit line 30 of the ignition module 27. If the contact 35 of the short circuit switch 33 produces the connection to ground 34, then the ignition module 27 is always short circuited and consequently is switched off (switched to inactive); the engine operation is disabled.

In position II of the control lever 32 of the operating mode selector 31, the short circuit switch 33 is open, the ignition module 2 is activated and the internal combustion engine is brought into operation; the engine operation is enabled.

A start position III of the operating mode selector 31 is provided in order to implement a starting sequence; if the control lever 32 moves to the start position III, the internal combustion engine and the fuel mixture-generating device—in the exemplary embodiment the carburetor 50—are placed into a start-up mode. In a start-up mode of this type the mixture is for example greatly enriched, in other words is enriched with fuel.

The start position III of the operating mode selector 31 is detected by way of a start position sensor 43 (FIG. 1) that in the illustrated exemplary embodiment is embodied as a switch, in particular as a microswitch having a switching contact 44 (FIG. 3). The switching contact 44 is electrically interconnected in accordance with FIG. 3 in the start safety circuit 40. If the control lever 32 is moved to the start position III, then the contact 44 of the start position sensor 43 is closed.

The start position sensor 43 is advantageously arranged directly at the control lever 32 of the operating mode selector 31, as shown in FIG. 1. It can also be practical to arrange the start position sensor 43, for example, on a choke valve of the carburetor 50 or on a throttle valve of the carburetor 50, in order to detect their start position; the start position of the choke valve and/or the throttle valve corresponds to the start position of the operating mode selector 31. The start position can for example also be detected by way of detecting the position of an arrangement of levers or other positioning means that are to be moved in order to set up a start position.

In addition, a brake position sensor 47 (FIG. 1) is provided on the work apparatus 1. The brake position sensor 47 .is allocated to the safety brake device 19 and in the illustrated exemplary embodiment is arranged, for example, on the release lever 18 of the safety brake device 19. If the release lever 18 is switched to its standby mode B, then the contact 48 of the brake position sensor 47 closes. In the case of a disengaged safety brake device 19, the brake band 24 (FIG. 2) lies on the driven part 16 of the clutch 11 and brakes the driven tool 8 until said driven tool is no longer moving, in other words disabling the movement of the tool 8. In this position S (FIG. 1), in which the brake of the safety brake device 19 is applied and the tool 8 is not moving, the contact 48 (FIG. 3) of the brake position sensor 47, which is allocated to the safety brake device 19, is open.

As the schematic of FIG. 3 illustrates, the short circuit line 30 of the ignition module 27 is to be connected, on the one hand, by way of the short circuit switch 33 to ground 34; parallel to that lies the start safety circuit 40 in accordance with the invention. The start safety circuit in the illustrated exemplary embodiment comprises a series connection of the contact 44 of the start position sensor 43, of the operating mode selector 31 and the contact 48 of the brake position sensor 47 of the safety brake device 19. The short circuit line 30 is connected to a ground point 36 by way of a series connection 37. The series connection 37 as a consequence forms a branch parallel to the short circuit switch 33. It can be practical to connect the short circuit switch 33 and the series connection 37 to a common ground point 38.

Figure 4:
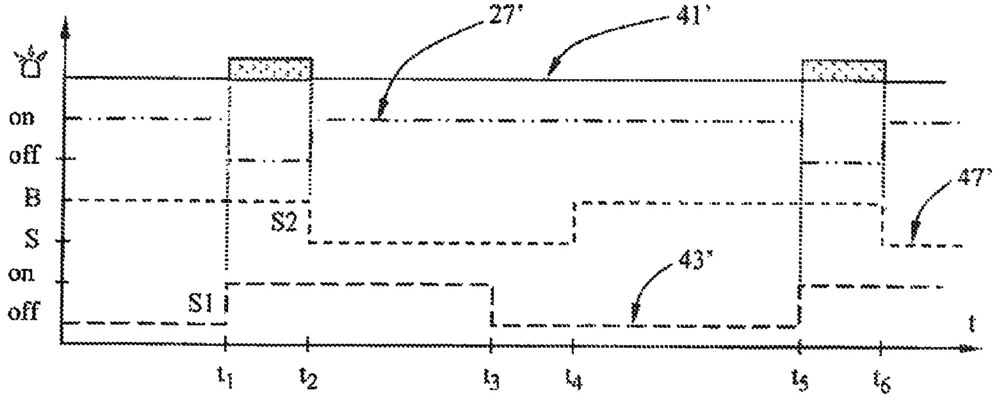
FIG. 4 shows a diagram relating to the logic switching statuses.

In FIG. 4, the function of the start safety circuit 40 is depicted schematically. The lower dashed line 43' represents the output signal S1 of the switching status of the start position sensor 43 of the operating mode selector 31. The dashed line 47' that lies above the lower dashed, line represents the output signal S2 of the brake position sensor 47 of the safety brake device 19. The dashed-dotted line 27' represents the operating status of the ignition module 27, while the upper continuous line 41' represents the status of an optical display 41, which, in the illustrated exemplary embodiment, is a LED 42 that is controlled by the ignition module 27.

If at a point in time $t_1$, the operating mode selector 31 is moved to the start position III by moving the control, lever 32, the contact 44 closes; the start position sensor 43 is switched on.

If the safety brake device 19 is in its standby mode B at the point in time $t_1$, as is represented by the dashed-dotted line in FIG. 1, the corresponding contact 48 of brake position sensor 47 is closed, and the short circuit line is connected to the ground point 36 by way of the closed contacts 44 and 48. The ignition module 27 is inactive; in other words, the ignition is switched off. The internal combustion engine 20 cannot be brought into operation; the engine operation is disabled.

The brake is therefore only applied if at the point in time $t_2$ the safety brake device 19 is disengaged and consequently the tool 8 is fixed in a non-rotatable manner; the contact 48 of the brake position sensor 47 of the safety brake device 19 opens, so that the ground connection to the short circuit line 30 of the ignition module 27 is interrupted. The ignition module 27 is active; the ignition is activated and the internal combustion engine 20 can be brought into operation.

If, at the point in time $t_3$, the control lever 32 of the operating mode selector 31 is switched to the operating position II, the contact 44 of the start position sensor 43 of the operating mode selector 31 also opens. Since the series connection of the sensors 43 and 47 is already opened by way of the opened contact 48, the status change of the start position sensor 43 of the operating mode selector 31 no longer has an effect.

Also, if at the point in time $t_4$ the applied brake of the safety brake device 19 is again released and the release lever 18 is moved into the standby mode B, the contact 48 of the brake position sensor 47 of the series connection 37 is in fact closed; since the operating mode selector 31 is in working mode [position II], the other contact 44 of the start position sensor 43 is opened, so that the short circuit line 30 is no longer connected to ground; the ignition module 27 is active, and the ignition is switched on.

If, on the other hand, at the point in time $t_5$ in the case of a released brake (safety brake device is in standby mode B) the operating mode selector 31 moves to the start position III, the contact 44 of the start position sensor 43 closes, so chat in turn both contacts 44 and 48 of the series connection 37 are closed, as a consequence of which the ignition module 27 becomes inactive as a result of the short circuit line 30 being connected to the ground point 36; the ignition is switched off and the engine operation is disabled. The control unit 60 is switched to inactive, the engine cut-off is activated, and the engine operation is disabled.

Only if at the point in time $t_6$ the safety brake device 19 is disengaged, in other words the brake is applied and the tool 8 is braked, does the switching status of the brake position sensor 47 of the safety brake device 19 change, and a contact of the series connection 37 is once again open; the ignition module 27 is active again; the ignition is switched on.

The status of the disabled engine operation (for example by way of the inactive control unit 60, in the exemplary embodiment a deactivated ignition), is displayed optically, for example by way of the LED 42. The LED 42 always glows if the ignition is switched off, in other words the engine operation is disabled. As a consequence, the optical display 41 is switched on during the periods of time $t_1$ to $t_2$ and $t_5$ to $t_6$.

Figure 5:
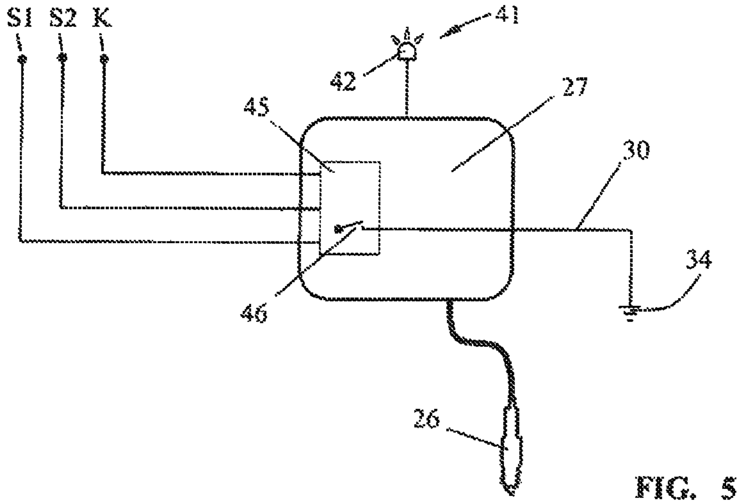
FIG. 5 shows an electrical diagram for an ignition module having an evaluating unit.

In the exemplary embodiment as shown in FIG. 5, an evaluating unit 45 is illustrated, wherein the signal S1 of the start position sensor 43 and the signal S2 of the brake position sensor 4 are transmitted to the evaluating unit. The signal of the short circuit switch 33 to switch off the internal combustion engine 20 is provided at the connection K. The sensors can be embodied as sensors chat function in a non-contacting manner. If the condition arises that the operating mode selector 31 is in the start position III and the safety brake device 19 is in its standby mode B with the brake disengaged, the switch 46 is closed and the short circuit line 30 is connected to ground 34. The control unit is inactive as a result of the ignition module 27 being switched to inactive, in other words by switching off the ignition module 27; ignition sparks can no longer be produced at the ignition plug 26. The internal combustion engine 20 cannot be started, in other words it cannot be brought into operation; the engine operation is disabled. The status of the inactive control unit and/or of the inactive ignition module 27 is displayed, by way of the optical display 41 that can be embodied as an LED, as is illustrated in the exemplary embodiment as shown in FIG. 3.

Instead of deactivating the ignition module 27 in order to disable the engine operation, it is also possible by way of the control unit 60 to disable the engine operation by switching off the fuel valve 55 or by keeping the fuel valve in the closed position. Also, as a consequence, the control unit 60 is switched to inactive, so that no ignitable mixture can flow into the combustion chamber, as a result of which the engine operation is disabled.

It is understood that the foregoing description is that of the preferred embodiments of the invention and that various changes and modifications may foe made thereto without departing from the spirit and scope of the invention as defined in the appended claims.

What is claimed is:

1. A start safety circuit arrangement in a work apparatus, the work apparatus including an internal combustion engine having a cylinder defining a combustion chamber and having a spark plug in said combustion chamber; said internal combustion engine further having an ignition module connected to said spark plug; a control unit configured for the operation of said engine by controlling a supply of combustion air and fuel to said combustion chamber to form an air/fuel mixture and igniting said air/fuel mixture via said spark plug connected to said ignition module; an operating mode selector having several positions and being configured for bringing said engine into operation; said several positions including an off position (I), an operating position (II) and a start position (III) for enriching said air/fuel mixture; a short circuit switch connected to said ignition module; said operating mode selector being configured to actuate said short circuit switch in said off position (I) to short circuit said ignition module and to open said short circuit switch in said operating position (II) to make said ignition module active; a work tool operatively connected to said engine; a brake unit operatively connected to said work tool; and, a safety brake device configured to brake said work tool via said brake unit in an operating state of said work tool and configured to enable said work tool in an operationally-ready state (B) when said brake unit is released; and, said start safety circuit arrangement comprising:

an operation sensor assigned to said safety brake device and configured for emitting a first status signal as to the operating state of said safety brake device;

a position sensor arranged on said operating mode selector and configured for emitting a second status signal; and, a circuit for combining said first and second status signals so as to cause said control unit to disable said operation of said engine when said operating mode selector is in said start position (III) and said safety braking device is in said operationally ready state (B) with said brake unit released.

2. The start safety circuit arrangement of claim 1, wherein said control unit includes an ignition module connected to said spark plug and said circuit is configured to switch said ignition module to be inactive for blocking the operation of said engine.

3. The start safety circuit arrangement of claim 1, wherein at least one of said sensors switches a contact.

4. The start safety circuit arrangement of claim 3, wherein said sensor is a switch.

5. The start safety circuit arrangement of claim 4, wherein said switch is a microswitch.

6. The start safety circuit arrangement of claim 1, further comprising an optical indicator for indicating the state of said control unit.

7. The start safety circuit arrangement of claim 6, wherein said optical indicator is an LED.

8. The start safety circuit arrangement of claim 1, wherein at least one of said sensors is configured as a contactless sensor.

9. The start safety circuit arrangement of claim 1, wherein said control unit includes a fuel valve for interrupting the supply of fuel for blocking the operation of said engine.

10. A start safety circuit arrangement in a work apparatus, the work apparatus including an internal combustion engine having a cylinder defining a combustion chamber and having a spark plug in said combustion chamber; a control unit configured for the operation of said engine by controlling a supply of combustion air and fuel to said combustion chamber to form an air/fuel mixture and igniting said air/fuel mixture via said spark plug; an operating mode selector for bringing said engine into operation; said operating mode selector including an operating position and start position (III) for enriching said air/fuel mixture; a work tool operatively connected to said engine; a brake unit operatively connected to said work tool; and, a safety brake device configured to brake said work tool via said brake unit in an operating state of said work tool and configured to enable said work tool in an operationally-ready state (B) when said brake unit is released; and, said start safety circuit arrangement comprising:

an operation sensor assigned to said safety brake device and configured for emitting a first status signal as to the operating state of said safety brake device;

a position sensor arranged on said operating mode selector and configured for emitting a second status signal;

a circuit for combining said first and second status signals so as to cause said control unit to disable said operation of said engine when said operating mode selector is in said start position (III) and said safety braking device is in said operationally ready state (B) with said brake unit released;

said control unit including an ignition module connected to said spark plug and said circuit being configured to switch said ignition module to be inactive for blocking the operation of said engine; and, said circuit including a short circuit line; and, said ignition module being switched to be inactive by connecting said short circuit line to ground.

11. The start safety circuit arrangement of claim 10, wherein said ignition module has a short circuit line connected thereto; said operation sensor and said position sensor are sensors having respective sets of contacts connected in series to define a series circuit; and, said series circuit is configured to connect said short circuit line to ground.

12. The start safety circuit arrangement of claim 11, further comprising a short circuit switch connected to said ignition module; and, said series circuit being arranged as a parallel branch to said short circuit switch.

13. The start safety circuit arrangement of claim 11, further comprising a short circuit switch connected between said ignition module and said ground.

14. The start safety circuit arrangement of claim 10, wherein at least one of said sensors switches a contact.

15. The start safety circuit arrangement of claim 14, wherein said sensor is a switch.

16. The start safety circuit arrangement of claim 15, wherein said switch is a microswitch.

17. The start safety circuit arrangement of claim 10, further comprising an optical indicator for indicating the state of said control unit.

18. The start safety circuit arrangement of claim 17, wherein said optical indicator is an LED.

19. The start safety circuit arrangement of claim 10, wherein at least one of said sensors is configured as a contactless sensor.

20. A start safety circuit arrangement in a work apparatus, the work apparatus including an internal combustion engine having a cylinder defining a combustion chamber and having a spark plug in said combustion chamber; a control unit configured for the operation of said engine by controlling a supply of combustion air and fuel to said combustion chamber to form an air/fuel mixture and igniting said air/fuel mixture via said spark plug; an operating mode selector for bringing said engine into operation; said operating mode selector including an operating position and start position (III) for enriching said air/fuel mixture; a work tool operatively connected to said engine; a brake unit operatively connected to said work tool; and, a safety brake device configured to brake said work tool via said brake unit in an operating state of said work tool and configured to enable said work tool in an operationally-ready state (B) when said brake unit is released; and, said start safety circuit arrangement comprising:

an operation sensor assigned to said safety brake device and configured for emitting a first status signal as to the operating state of said safety brake device;

a position sensor arranged on said operating mode selector and configured for emitting a second status signal;

a circuit for combining said first and second status signals so as to cause said control unit to disable said operation of said engine when said operating mode selector is in said start position (III) and said safety braking device is in said operationally ready state (B) with said brake unit released;

at least one of said sensors being configured as a contactless sensor;

a logic evaluation unit and a short circuit switch generating a signal; and, said circuit being configured to supply said first and second status signals and said signal of said short circuit switch to said logic evaluation unit.

* * * * *

UNITED STATES PATENT AND TRADEMARK OFFICE

CERTIFICATE OF CORRECTION

PATENT NO. : 9,005,083 B2
APPLICATION NO. : 13/930021
DATED : April 14, 2015
INVENTOR(S) : Carel Karrar It is certified that error appears in the above-identified patent and that said Letters Patent is hereby corrected as shown below:

In the Specification

<u>In column 2</u>:
Line 12: delete “engines” and substitute -- engine -- therefor.

<u>In column 5</u>:
Line 2: delete “shore” and substitute -- short -- therefor.
Line 11: delete “2” and substitute -- 27 -- therefor.

<u>In column 6</u>:
Line 54: delete “chat” and substitute -- that -- therefor.

<u>In column 7</u>:
Line 14: delete “chat” and substitute -- that -- therefor.
Line 39: delete “foe” and substitute -- be -- therefor.

Signed and Sealed this
Eleventh Day of August, 2015

Michelle K. Lee
*Director of the United States Patent and Trademark Office*